United States Patent
Bellington

(10) Patent No.: US 6,397,781 B1
(45) Date of Patent: Jun. 4, 2002

(54) PREFABRICATED BIRD HOUSE

(75) Inventor: Bruce M. Bellington, Lone Jack, MO (US)

(73) Assignee: Action Products Company, Odessa, MO (US)

( * ) Notice: Subject to any disclaimer, the term of this patent is extended or adjusted under 35 U.S.C. 154(b) by 0 days.

(21) Appl. No.: 09/576,808

(22) Filed: May 23, 2000

(51) Int. Cl.[7] .............................................. A01K 31/14
(52) U.S. Cl. ...................................... 119/431; 119/432
(58) Field of Search ............................... 119/428, 429, 119/431, 432, 433, 434, 435

(56) References Cited

U.S. PATENT DOCUMENTS 2,292,614 A * 8/1942 Copeman .................... 119/431
D170,833 S * 11/1953 Rebora .................... 119/431 X
3,478,722 A * 11/1969 Falcone et al. ............. 119/431
6,170,437 B1 * 1/2001 Jones ......................... 119/428

* cited by examiner

Primary Examiner—Robert P. Swiatek
(74) Attorney, Agent, or Firm—Hovey Williams LLP

(57) ABSTRACT

A prefabricated bird house for easy assembly and transport and method of assembling the same. The bird house includes a plurality of walls wherein each pair of adjacent walls presents at least one pair of complemental latches that are configured for latching interengagement when the adjacent walls are assembled. When the latch elements are in latching interengagement, the walls are interconnected in such a manner that they are permitted to shift freely lengthwise relative to one another, but are prevented from shifting in a generally transverse, lateral direction.

5 Claims, 2 Drawing Sheets

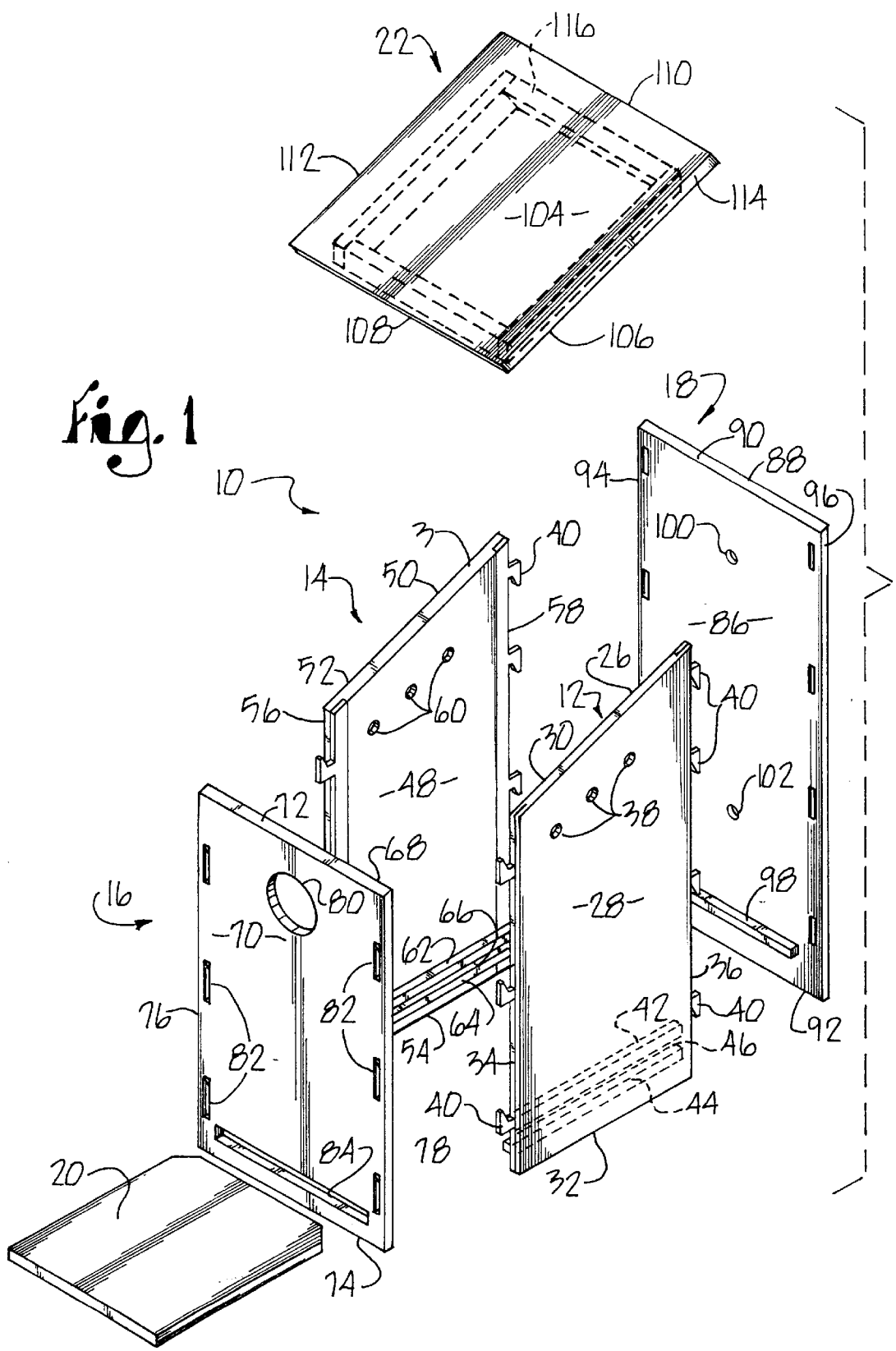

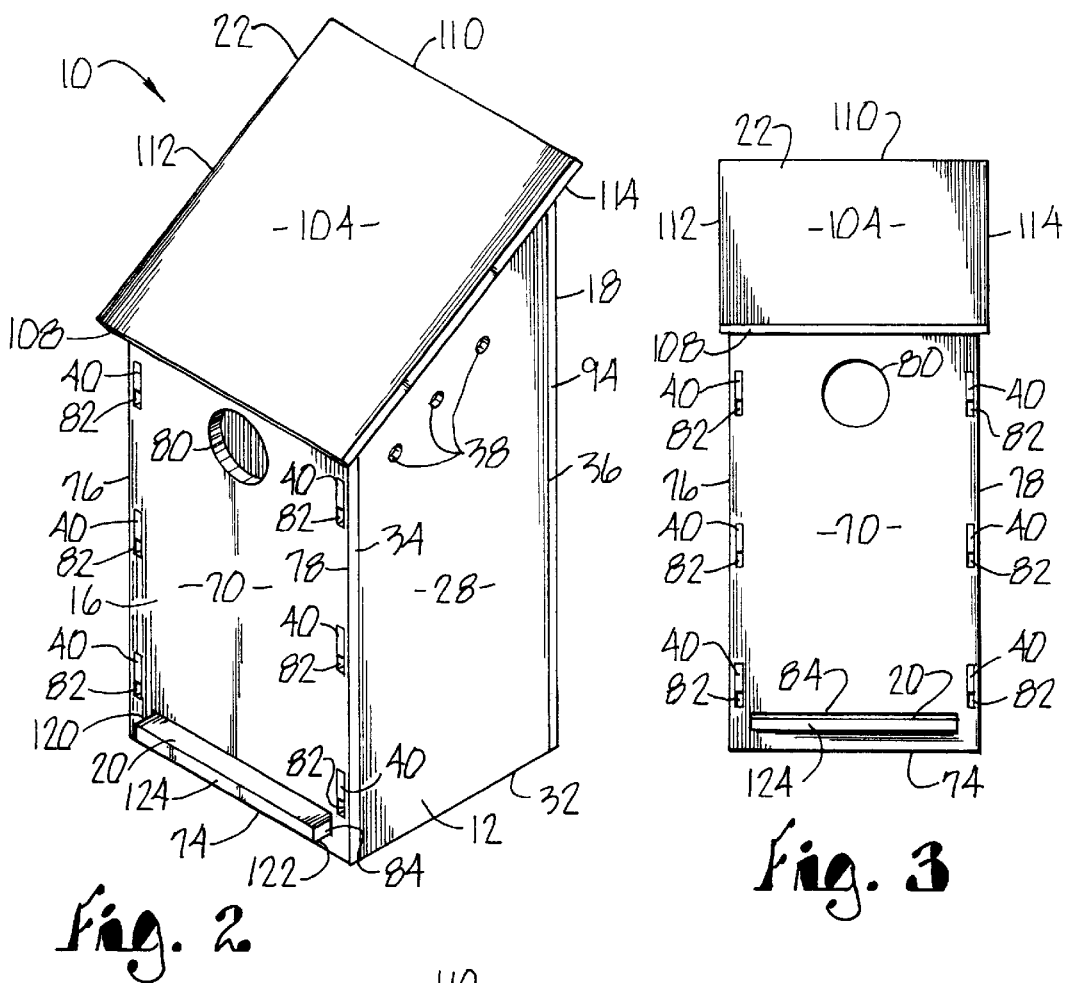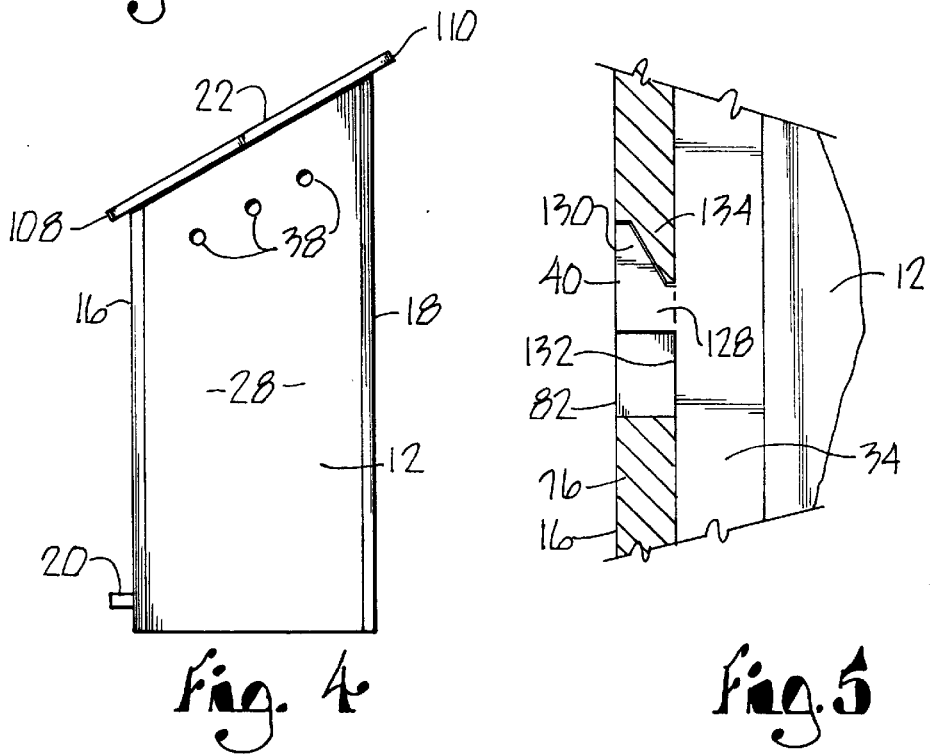

PREFABRICATED BIRD HOUSE

BACKGROUND OF THE INVENTION

1. Field of the Invention

The present invention relates to a prefabricated bird house. In particular, the invention pertains to a prefabricated bird house capable of easy assembly by means of integral locking structure thereby eliminating the need for additional tools or parts for assembly.

2. Description of the Prior Art

Birds are usually welcomed guests at a person's property. Their calls to each other provide entertainment and their colors and markings can be pleasing to the eye. More importantly, birds typically consume insect pests, which facilitates insect-free entertaining outdoors and prevents the spread of disease by insect carriers. Thus, bird houses are often constructed and placed in such a manner to attract birds to a property for nesting purposes.

The prior art discloses a variety of pre-assembled housing structures for accommodating different species of birds. The bird houses of the prior art are typically made of wood, plastic or other rigid material which is relatively bulky. These characteristics of the traditional bird house have certain disadvantages. The rigidity, bulk and weight of such bird houses creates disadvantageous economies in respect to the storage, transport and ease of use of the bird house. A bird fancier who desires to purchase a bird house may be concerned with transportability, not only from the store to home or other location of use, but from place to place as the user may have a temporary or permanent relocation of the site where the bird house will be used. It would be a desirable improvement to provide a bird house which is prefabricated and easily disassembled for storage or transport and then easily reassembled at its site of use.

SUMMARY OF THE INVENTION

The present invention solves the prior art problems discussed above and provides a distinct advance in the state of the art. In particular, the bird house hereof enables ease of assembly, storage and transport.

The preferred embodiment includes a prefabricated bird house comprising a housing that defines a bird nesting enclosure and includes a plurality of walls. The housing further defines an access hole for permitting ingress and egress of birds. Each pair of adjacent walls present at least one pair of complemental latch elements that are configured for latching interengagement when the adjacent walls are assembled. When the latch elements are in latching interengagement, the walls are interconnected in such a manner that they are permitted to shift freely lengthwise relative to one another, but are prevented from shifting in a generally transverse, lateral direction. A method of mounting the bird house of the present invention on a support is also described.

BRIEF DESCRIPTION OF THE DRAWINGS

FIG. 1 is an exploded perspective view of the preferred unassembled bird house in accordance with the present invention;

FIG. 2 is a perspective view of the preferred assembled bird house;

FIG. 3 is a front elevational view of the bird house;

FIG. 4 is a side elevational view of the bird house;

FIG. 5 is a fragmentary cross-sectional view which illustrates the L-shaped locking tabs in locking engagement with the slots of the front wall.

DETAILED DESCRIPTION OF THE PREFERRED EMBODIMENT

Referring to the drawings, FIG. 1 illustrates a preferred prefabricated bird house 10 in accordance with the present invention in a disassembled state. Broadly, birdhouse 10 includes a left side wall 12, a right side wall 14, a front wall 16, a rear wall 18, a floor 20, and a roof 22, all generally rectangular. Walls 12, 14, 16, 18, floor 20, and roof 22 cooperatively define an interior bird nesting cavity 24.

In more detail, left side wall 12 includes inner face 26 and opposed outer face 28, upper edge 30 and opposed lower edge 32, and front attachment edge 34 and opposed rear attachment edge 36. A plurality of ventilation holes 38 extend through side wall 12 proximal upper edge 30 for permitting air to flow in and out of cavity 24. Upper edge 30 slopes generally downwardly from rear edge 36 to front edge 34. Attachment edges 34 and 36 each include at least one locking tab 40 configured for locking engagement with walls 16 and 18 which will be discussed in more detail below. Inner face 26 includes outwardly extending first guide rail 42 and second guide rail 44, as shown in phantom lines in FIG. 1, proximal lower edge 32 that form a track 46 therein configured to slidably receive floor 20.

Right side wall 14 includes inner face 48 and opposed outer face 50, upper edge 52 and opposed lower edge 54, and front attachment edge 56 and opposed rear attachment edge 58. A plurality of ventilation holes 60 extend through side wall 14 proximal upper edge 52 for permitting air to flow in and out of cavity 24. Upper edge 52 slopes generally downwardly from rear edge 58 to front edge 56. Attachment edges 56 and 58 each include at least one locking tab 40 configured for locking engagement with walls 16 and 18. Inner face 48 includes outwardly extending first guide rail 62 and second guide rail 64 that form a track 66 therein configured to slidably receive floor 20.

Front wall 16 includes inner face 68 and opposed outer face 70, upper edge 72 and opposed lower edge 74, and left attachment edge 76 and opposed right attachment edge 78. A bird access hole 80 extends through front wall 16. Access hole 80 is positioned for permitting a bird to enter and exit birdhouse 10 in its assembled state. Left edge 76 and right edge 78 each include at least one locking slot 82 configured to engage a like number of locking tabs 40. Front wall 16 further includes an aperture 84 proximal lower edge 74 configured to receive floor 20.

Rear wall 18 includes inner face 86 and opposed outer face 88, upper edge 90 and opposed lower edge 92, and left attachment edge 94 and opposed right attachment edge 96. Left edge 94 and right edge 96 each include at least one locking slot 82 configured to engage a like number of locking tabs 40. Rear wall 18 further includes an inwardly-projecting ledge 98 proximal lower edge 92 configured to receive and support floor 20 thereon. Rear wall 18 further includes a top support element 100 proximal upper edge 90 and a bottom support element 102 proximal lower edge 92. Elements 100 and 102 being configured for fastening to a tree, post, or the like. It will be appreciated that elements 100 and 102 may include a hole configured to receive a screw or nail as shown in FIG. 1 or may also include tabs projecting outwardly from rear wall 16 configured to couple with a support structure.

Roof 22 is configured to removably engage upper edges 30, 52, 72, and 90 of walls 12, 14, 16 and 18. Roof 22 includes opposed upper face 104 and lower face 106, opposed front edge 108 and rear edge 110, and opposed left edge 112 and right edge 114. Lower face 106 includes a boss 116 configured to complementally engage upper edges 30,52, 72, and 90. Rear edge 110 may also include a cut-away notch (notch) for complemental engagement with top support element 100. Roof 22 presents a downwardly sloping surface from rear edge 110 to front edge 108 when assembled with walls 12, 14, 16 and 18.

Floor 20 includes left edge 120 and opposed right edge 122 and further includes front edge 124 and opposed rear edge 126. Rear edge 126 is configured to be received within aperture 84 and rest upon ledge 98. Left edge 120 is configured to cooperatively engage track 46 and right edge 122 is configured to cooperatively engage track 66.

FIG. 5 illustrates left wall 12 and front wall 16 in locking interengagement. Left wall 12 includes the preferred locking tab 40 and front wall 16 includes the preferred tab-receiving slot 82 configured to interengage edges 34 and 76, respectively. Locking tab 40 presents a horizontal section 128 and generally transverse first catch 130 depending therefrom. First catch 130 slopes generally outwardly and transversely relative to horizontal section 128 and is configured for locking engagement with tab-receiving slot 82. It will be appreciated that first catch 130 may be oriented upward as illustrated in FIG. 1 on front edge 34 of left wall 12 or downward as shown on the rear edge 36 of left wall 12. Left edge 76 of front wall 16 includes slot 82 extending through front wall 16 for receiving locking tabs 40. Slot 82 includes an inner surface 132 presenting a generally sloped second catch 134 configured for receiving first catch 130 in locking engagement.

In preferred forms, walls 12, 14, 16, 18, floor 20 and roof 22 are each integrally formed from wood, synthetic resin material or other materials that provide relatively maintenance-free use of bird house 10. It will also be appreciated that walls 12, 14, 16, 18, floor 20 and roof 22 may be rectangular, square or any other shape that allows interconnecting of the side edges thereof. The bird house 10 of the present invention is specifically designed for simple and quick assembly as a result of the complemental locking tabs 40 and slots 82.

To assemble bird house 10, as shown in FIGS. 2, 3, and 4, top support element 100 and bottom support element 102 of rear wall 18 may be fastened to a tree, post, or other support structure by a nail, screw, or other fastening means. Left wall 12 is interconnected to rear wall 18 by aligning at least one locking tab 40 with a corresponding locking slot 82, sliding tab 40 forward into slot 82 until first catch 130 engages second catch 134 and then shifting tab 40 until the sloped surface of first catch 130 is in locking engagement with the complemental sloped surface of second catch 134 as shown in FIG. 5. Right wall 14 may then be interconnected to rear wall 18 in a similar manner. Any attempt to remove walls 12 or 14 by pulling them outwardly will result in catches 130 and 134 cooperatively preventing such attempted removal in addition to preventing lateral movement of walls 12 and 14.

Front wall 16 interconnects to left wall 12 and right wall 14 by aligning left edge 76 having at least one slot 82 therein with a corresponding locking tab 40 on left wall 12 , and aligning right edge 78 having at least one slot 82 therein with a corresponding locking tab 40 on right wall 14, sliding the corresponding slots 82 forward to receive a complemental tab 40 until first catch 130 engages second catch 132 and then shifting tab 40 until the sloped surface of first catch 130 is in locking engagement with the complemental sloped surface of second catch 134. Floor 20 is inserted into and through aperture 84 so that left edge 120 is received by track 46 and right edge 122 is received by track 66. Floor 20 is then slidably shifted toward rear wall 18 where it engages ledge 98 for locking support thereon thereby preventing walls 12, 13, 16 and 18 from shifting lengthwise or laterally. To complete assembly of bird house 10, roof 22 is coupled to side walls 12 and 14, front wall 16 and rear wall 18 proximal upper edges 30, 52, 72, and 90 by complemental engagement of boss 116 with the interior of bird house 10.

Although preferred forms of the invention have been described above, it is to be recognized that such disclosure is by way of illustration only, and should not be utilized in a limiting sense in interpreting the scope of the present invention. Obvious modifications to the exemplary embodiments, as set forth above, could be readily made by those skilled in the art without departing from the spirit of the present invention.

The inventor hereby states his intent to rely on the Doctrine of Equivalents to determine and assess the reasonably fair scope of their invention as pertains to any apparatus not materially departing from but outside the literal scope of the invention as set out in the following claims.

I claim:

1. A prefabricated bird house comprising:

a housing defining a bird-nesting enclosure and including a plurality of walls, said housing including an access hole defined therein for permitting ingress to and egress from said enclosure by a bird, each pair of adjacent walls presenting at least one pair of complemental latch elements configured for latching interengagement when the adjacent walls are assembled, with each of the complemental latch elements including a catch and a complemental slot, wherein the catch has an outwardly projecting horizontal section and a generally transverse sloped section configured to be received by the complemental slot and latched onto the adjacent wall, and the complemental slot has a guide ramp defined therein for cooperatively engaging said sloped section of said catch, said complemental latch elements, when in latching interengagement, interconnect said adjacent walls in such a manner that the adjacent walls are permitted to shift freely lengthwise relative to one another and are prevented from shifting in a generally transverse, lateral direction.

2. A bird house comprising:

a housing defining a bird-nesting enclosure and including an access hole for permitted ingress to and egress from the bird-nesting enclosure by a bird, the housing including
- a front wall having an elongated aperture defined therethrough;
- a rear wall having a rear ledge projecting into the enclosure; and
- a right side wall and a left side wall, each being removably coupled with the front wall and the rear wall and each having a side ledge projecting into the enclosure; and
- a floor slidably received into the enclosure through the elongated aperture and substantially supported therewithin by the side ledges and the rear ledge,
- wherein the right side wall and the left side wall are removably coupled with the front wall and the rear wall by a plurality of complemental latch elements, with each of the complemental latch elements including a tab-receiving slot operable to receive and cooperatively engage a projecting locking tab.

3. The bird house as set forth in claim 2, wherein the aperture, the side ledges, and the rear ledge are configured to receive and support the floor in locking engagement.

4. The bird house as set forth in claim 2, wherein the projecting locking tab includes a first section and a second section, wherein the second section is substantially transverse to the first section and is sloped, and the tab-receiving slot includes a guide ramp defined therein for receiving and cooperatively engaging the second section of the projecting locking tab.

5. A bird house comprising:

a housing defining a bird-nesting enclosure and including an access hole for permitted ingress to and egress from the bird-nesting enclosure by a bird, the housing including
- a first wall presenting a projecting locking tab having a first section and a second section, wherein the second section is substantially transverse to the first section and is sloped;
- second wall presenting a tab-receiving slot having a guide ramp defined therein for receiving and cooperatively engaging the sloped second section of the projecting locking tab.

\* \* \* \* \*